(12) United States Patent
Pilney et al.

(10) Patent No.: US 12,139,344 B2
(45) Date of Patent: Nov. 12, 2024

(54) BEVERAGE CRATE WITH CENTRING FUNCTION FOR BOTTLES AND ADDITIONAL RECESS FOR SERIALISATION APPLICATION

(71) Applicant: KRONES AG, Neutraubling (DE)

(72) Inventors: Elisabeth Pilney, Lappersdorf (DE); Katarina Mehringer, Regensburg (DE); Eduard Rupp, Freudenberg (DE)

(73) Assignee: KRONES AG (DE)

( * ) Notice: Subject to any disclaimer, the term of this patent is extended or adjusted under 35 U.S.C. 154(b) by 90 days.

(21) Appl. No.: 18/081,203

(22) Filed: Dec. 14, 2022

(65) Prior Publication Data

US 2023/0183019 A1 Jun. 15, 2023

(30) Foreign Application Priority Data

Dec. 14, 2021 (DE) ...................... 10 2021 133 125.0

(51) Int. Cl.
*B65G 43/08* (2006.01)
*B08B 9/46* (2006.01)
(Continued)

(52) U.S. Cl.
CPC ............. *B65G 43/08* (2013.01); *B08B 9/46* (2013.01); *B65D 1/243* (2013.01); *G01N 21/90* (2013.01);
(Continued)

(58) Field of Classification Search
CPC ............ B65G 43/08; B65G 2201/0258; B65G 2203/041; B65D 1/243;
(Continued)

(56) References Cited

U.S. PATENT DOCUMENTS

| 11,308,601 B2 * | 4/2022 | Dordoni | ................. H04N 23/56 |
| 2005/0211593 A1 | 9/2005 | Budin | .................... B65D 85/00 |

(Continued)

FOREIGN PATENT DOCUMENTS

| DE | 1934560 | 10/1966 | |
| DE | 10359781 | 8/2005 | ............... B01V 8/12 |

(Continued)

OTHER PUBLICATIONS

German Search Report issued in German Patent Appln. Serial No. 10 2021 133 125.0, dated Aug. 16, 2022, with machine English translation, 8 pages.

(Continued)

*Primary Examiner* — James R Bidwell
(74) *Attorney, Agent, or Firm* — HAYES SOLOWAY P.C.

(57) ABSTRACT

Disclosed is a method for inspecting bundles, wherein receiving containers equipped with containers are transported by a first transport device and wherein the containers each have a marking in their bottom regions which unambiguously identifies the containers, wherein an image recording device records at least one image of the bottom regions of the containers located in the receiving container and at least one information is output which is characteristic of the markings arranged on the containers and/or of at least one property of the containers.

12 Claims, 2 Drawing Sheets

(51) Int. Cl.
  *B65D 1/24* (2006.01)
  *G01N 21/90* (2006.01)

(52) U.S. Cl.
  CPC .............. *B65D 2501/24133* (2013.01); *B65D 2501/24216* (2013.01); *B65G 2201/0258* (2013.01); *B65G 2203/0216* (2013.01); *B65G 2203/041* (2013.01)

(58) Field of Classification Search
  CPC ........... B65D 2501/24133; B65D 2501/24216; G01N 21/90; B08B 9/46
  See application file for complete search history.

(56) References Cited

U.S. PATENT DOCUMENTS

| | | | | |
|---|---|---|---|---|
| 2005/0218126 | A1 | 10/2005 | Leyvraz | B23K 26/40 |
| 2013/0306729 | A1* | 11/2013 | Dilks | G01N 35/00732 235/455 |
| 2017/0024896 | A1* | 1/2017 | Houghton | G06T 7/66 |
| 2020/0139407 | A1 | 5/2020 | Welker et al. | B07C 3/542 |

FOREIGN PATENT DOCUMENTS

| | | | |
|---|---|---|---|
| DE | 102008029952 | 12/2009 | ............... G07F 7/06 |
| DE | 202017105355 | 12/2017 | ............. G01N 21/90 |
| DE | 102017004358 | 11/2018 | ............. B07C 5/342 |
| DE | 102017120410 | 3/2019 | ............. B07C 5/342 |
| DE | 102017120410 A1 * | 3/2019 | ............. B07C 5/126 |
| DE | 102018132132 | 4/2020 | ............. G01N 21/90 |
| DE | 102019201229 | 8/2020 | ............. B25J 13/08 |
| EP | 0094530 | 4/1983 | ............... B65D 1/24 |
| EP | 0114392 | 12/1983 | ............... B65D 1/38 |
| EP | 0452751 | 4/1991 | ............... B65D 1/38 |
| EP | 2682756 | 1/2014 | ............. G01N 35/00 |
| EP | 3165909 | 10/2016 | ............. G01N 21/94 |
| WO | WO-2019025747 A1 * | 2/2019 | ....... G01N 35/00732 |

OTHER PUBLICATIONS

European Search Report issued in European Patent Appln. Serial No. 22212237.6, dated Apr. 25, 2023, with machine English translation, 16 pages.

* cited by examiner

BEVERAGE CRATE WITH CENTRING FUNCTION FOR BOTTLES AND ADDITIONAL RECESS FOR SERIALISATION APPLICATION

BACKGROUND OF THE INVENTION

The present invention relates to an apparatus and a method for inspecting bundles. Numerous apparatus and methods for inspecting bundles and, in particular, beverage crates fitted with containers are known from the prior art.

Numerous beverage crates that serve different functions are also known from the prior art. For example, beverage crates are known from EP 0114392 A1 and EP 0452751 A1, which have a centring function for bottles. This serves to precisely align the containers in the receiving container such as a beverage crate. In this way, containers and especially bottles can be transported more safely and with less noise. In addition, the removal of the bottles by a robot is also facilitated.

In addition, it is known from the state of the art to individualise containers, which is facilitated, for example, by applying markings and 2-D codes, in particular QR or data matrix codes, transponders or the like to the containers. These markings can be applied to different positions on the containers, for example on their peripheral walls. However, this means that the containers must be aligned in their rotational position in order to detect the markings.

However, the sometimes very high production speed causes problems. If containers (especially in future applications) are to be serialised and/or individualised (for traceability in production or information acquisition for the end consumer such as origin or reusable cycles), this could be realised, for example, with a QR code in a predefined area of the container.

The present invention is therefore based on the object of facilitating such serialisation and/or tracking of containers.

SUMMARY OF THE INVENTION

In a method for inspecting bundles according to the invention, bundles, in particular in the form of receiving containers equipped with containers, are transported by means of a first transport device, wherein the containers each having a marking in their bottom regions which unambiguously identifies the containers and/or which allows conclusions about at least one characteristic property of the containers.

According to the invention, an image recording device records at least one (spatially resolved) image of the bottom regions of the containers located in the bundle and/or receiving container and at least one information is output which is characteristic of the markings arranged on the containers and/or the containers and/or at least one property of the containers.

Preferably, each marking is characteristic of the container on which it is arranged. This means that the markings of all markings arranged on said containers differ from each other in at least one property and/or in at least one feature.

The applicant has determined that placing said markings on the bottom of the containers has several advantages. An essential advantage of a marking arranged at the bottom region is that this marking can be visually detected independently of a rotational position of the container with respect to its longitudinal direction. A further advantage of placing the marking on the bottom region of the container is that the circumferential wall of the containers can remain free of such markings (which could disturb the end user).

A disadvantage of placing the marking in the bottom region is that this bottom region is not or only with difficulty accessible or observable at a plurality of transport devices, such as conveyor belts.

Preferably, the bottom region of the container is the area that is visible from below, i.e. the outer surface of the container facing the respective base in an upright container.

Preferably, the containers are bottles and in particular plastic bottles or glass bottles. In a further preferred embodiment, the receiving container is a receiving container which is suitable and intended for receiving a plurality of containers and in particular a plurality of bottles.

Preferably, the bottoms of the containers are viewed through corresponding openings of the receiving container (in particular of the bottom region or regions of the receiving container or receiving areas). Particularly preferably, the receiving container(s) are boxes, crates or cartons suitable and intended for receiving the containers. Particularly preferably, at least four, preferably at least six and preferably at least eight containers are accommodated in the receiving container. Preferably, at most 40, preferably at most 35, preferably at most 30 and preferably at most 25 containers are accommodated in the receiving areas of the receiving container.

Particularly preferably, the markings are machine-readable markings and/or markings that can be read without contact and in particular optically. Particularly preferably, the markings are selected from a group of markings containing barcodes, QR codes and the like. However, it is also conceivable that other markings, for example smart labels, are arranged on the containers.

In a particularly preferred embodiment, an image evaluation device is provided which evaluates the recorded images. The image recording device can identify the markings and, particularly preferably, also read out or evaluate the markings.

In a preferred embodiment, the markings are inseparably connected to the containers. This means in particular that it is not possible to remove the marking from the containers without destroying the container. It is possible that the marking is directly printed (in particular by direct printing) or engraved (for example by laser engraving) on an outer surface of the container.

In a further preferred embodiment, a marking is characteristic of properties of the container on which it is located. These properties may be properties such as an age of the container, a number of times the container has been circulated, a manufacturer of the container, a material of the container, a beverage with which the container is filled and the like.

Particularly preferably, the containers are reusable containers. They can be glass containers as well as plastic containers (e.g. made of PET). Particularly preferably, the marking serves to serialise the containers.

Particularly preferably, the receiving container thus has receiving areas for the individual containers and additionally, in particular in a bottom region, a recess, for example in the form of a rectangle and in particular a square, which enables observation or image recording of the marking attached to the container.

The image recording device, which is in particular a camera or a camera system, is particularly preferred for reading the markings, for example QR codes, attached to the bottle bottoms. This image recording device is preferably arranged in such a way that a further machine, such as a robot, can move the receiving containers over it and, in particular, swivel them over it.

It is possible that the receiving container or a pallet with receiving containers is/are stopped above the image pick-up device so that the image recording device can read the visible bottle bottoms and thus the markings.

Particularly preferably, the image recording device is arranged stationary and the receiving containers are transported past the image recording device. It is particularly preferable that the image recording device is arranged next to the above-mentioned transport device on which the receiving containers with the containers are transported. In this way, as little time as possible is required for reading.

However, it would also be conceivable that the image recording device is arranged on a gripping device that receives the containers from the first transport device.

However, it is also conceivable that a transport device is provided which transports the receiving containers bottom-free so that an image recording device such as a camera arranged below this transport device can record the container bottoms or the markings arranged on these container bottoms. Such a transport device could, for example, have lateral guide belts or conveyor belts which support the receiving containers only at their edges. Such a transport device could also have transparent belts on which the receiving containers are conveyed.

It is possible that components of the image recording device, such as camera lenses, are aligned directly to the receiving containers, or are also arranged horizontally with respect to the receiving containers with the aid of one or more mirrors, for example a mirror cabinet, in order to facilitate the installation and maintenance of the image recording device if necessary.

By using such mirrors or mirror cabinets, the angle of detection can be enlarged with an image receiving device or camera. Depending on the size of a pallet, it is possible to use only one image receiving device, but it would also be conceivable to use several image receiving devices or cameras. This can be taken into account in the evaluation software.

In a further preferred method, the receiving devices and in particular the container bottoms are illuminated for the purpose of image recording. Preferably, this illumination is synchronised with the image recording.

In a further preferred embodiment, the image recording device records exactly one image of the bottom regions of the containers, but it would also be conceivable that several images are recorded.

In a further preferred method, at least one bundle or a receiving container equipped with a plurality of containers, preferably several and particularly preferably all receiving containers are gripped by means of a gripping device and brought into an image receiving area of the image receiving device. This can be done as described in more detail below, for example by pivoting into an image recording area of the image recording device.

It is pointed out in this context that the term "bundle" in the context of the present patent application refers in particular to the receiving containers fitted with containers and that the receiving containers are in particular (beverage) crates, (beverage) boxes.

Particularly preferably, the bundles or the receiving devices are transported by means of a second transport device, which differs in particular from the first transport device, for the purpose of taking an image.

It is possible that this second transport device, in particular a robot, takes the bundles from the first transport device, for example a conveyor belt, and moves them, for example pivots them, to the image recording device for image recording.

Subsequently, the containers can be arranged again on the first transport device. In a preferred embodiment, several second transport devices are provided which transfer the containers to one or more image recording areas of one or more image recording devices. In this way, the throughput can be increased at higher transport speeds.

Particularly preferably, the gripping device is a (robot) gripper. Particularly preferably, the gripping device is an active and/or a controlled gripping device which can be switched between an open position in which the container is disengaged and a gripping position in which the container can be gripped. Particularly preferably, the gripping device is suitable and intended for gripping the receiving containers on at least two opposite walls.

Particularly preferably, the bundles are transported above an image recording area of the image recording device, so that the image recording device can observe the container bottoms—in particular from below. Particularly preferably, a transport path of these second transport devices, such as the robot device, is essentially freely programmable.

In a further preferred method, the second transport device removes the receptacles from the first transport device and, preferably, the second transport device places the receiving containers back on the first transport device in terms of time and/or location after the image has been captured. Preferably, the receiving containers are removed from the first transport device for the purpose of taking the image and are also preferably placed back on the first transport device.

In a further preferred method, a movement of the bundles or receiving containers is stopped at least temporarily in order to record an image of the bottom regions. It is possible that the containers are taken from the first transport device, transported over the image recording device and the movement is stopped there. The bundles can then be returned to the first transport device (but possibly at a different position).

In a further preferred method, the containers are positioned in predetermined positions relative to the receiving containers. For example, insertion aids such as insertion slopes can be provided, which precisely determine or align the position of the containers and in particular also the container bottoms with respect to the receiving areas.

In a further preferred method, a certain proportion, preferably at least one and preferably several containers, are removed from the receiving container after inspection. For example, it would be possible to remove containers whose marking indicates a defect or the need to eject this container, e.g. if the maximum number of cycles of this container has already been exceeded. It is also possible to reject containers that do not have a marking.

For this purpose, a removal device can be provided, which is in particular arranged downstream of the image recording device and/or the second transport device in the transport direction of the receiving containers. Preferably, this removal device is suitable and intended for removing individual containers from the receiving container. For this purpose, this removal device can have one or more gripping devices which are suitable and intended for gripping individual containers located in the receiving container.

Particularly preferably, this removal device is controlled in dependence on at least one image captured by the image recording device. If, for example, it is determined that a particular container is defective, the removal device can subsequently remove this container from the receiving container.

In order to sort out containers that are not to be moved further in a line or processed further, or those that do not have a QR code or other marking, a removal device or packer device could be provided, which preferably has individually controllable packer tulips in order to remove unwanted containers from the receiving container in this way. For this purpose, a comprehensive communication protocol is particularly preferred, which can, for example, exchange data across the cell level of the line machine in order to pass on the exact positions of the unwanted bottles.

Particularly preferably, the apparatus has a memory device in which information about any defective containers within the receiving container or box can be stored.

Particularly preferably, the proportion of containers is removed in response to an image captured by the image recording device. For example, containers without a marking or a code can be sorted out, or containers with an incorrect or false code can be sorted out.

Particularly preferably, certain containers, for example removed containers, are subjected to a special treatment in the further process, for example a washing process or a disposal process. In this case, it is possible that certain containers, for example reusable containers, are moved together or without the receiving container into a washing system such as a washing line. In this case, the containers are preferably not sorted out first.

The selection process of the containers in the crates is the same as described above, but here the washing device itself preferably removes defective containers and carries them away.

Preferably, other containers to be cleaned are also removed and run through a separate washing line in a washing machine (preferably simultaneously with the receiving container).

In the applicant's internal prior art, receiving containers are sorted out and washed separately. An advantage may be that the clean containers can be reinserted into the beverage crate, i.e. the receiving container, at the end of a washing cycle. Preferably, the containers are then filled again. Particularly preferably, a linear filling machine is used for filling. The advantage of using a linear filling machine is that it can also process receiving containers or beverage crates with containers.

In a further preferred method, at least a portion of the containers is removed from the receiving container. This can be, for example, defective containers or containers that are no longer to be processed. In addition, it can also be containers that do not have any marking.

In another preferred method, at least one container or the portion of containers is removed in response to an image captured by the image recording device. This removal can take place immediately after the inspection. However, it would also be conceivable for this removal to take place at a later point in the processing. It would also be possible that corresponding empty positions of the receiving container are reloaded with containers.

The present invention is further directed to a receiving container for receiving containers, wherein the receiving container having a plurality of receiving areas for receiving the containers separately from one another and in the same orientation. At least one and preferably exactly one container can be received in each receiving area and the receiving container has at least one wall delimiting this receiving container.

Furthermore, a bottom is provided in each of these receiving areas to support the containers via their bottom regions.

According to the invention, each of these bottoms has a recess through which a bottom of a container located in this receiving area can be observed and/or inspected.

In particular, this recess can preferably be a recess with a square or rectangular or circular cross-section. However, this recess preferably has a cross-section that is smaller than the cross-section of the bottom region of the container so that it is still supported by the bottom region and cannot fall downwards out of the receiving container.

Said opening of the recess preferably enables scanning functions that require visual contact. The advantage in using a rectangular or square shape of the recess or opening is that this shape facilitates axial storage of the containers.

The serialisation of containers plays a major role, especially in returnable cycles of returnable bottles. Here, the traceability of the reusable cycles already completed by the containers can be viewed by a beverage manufacturer and also by the end customer, thus enabling more efficient handling in the reusable line.

As an example, container washing can be mentioned, in which certain containers are ejected from the process (due to age or excessive soiling) or possibly in the future can also precisely respond to the respective degree of soiling of a container type or container. In this way, the reusable process can be streamlined and thus time and energy can be saved.

Particularly preferably, at least one of the receiving areas and preferably each of the receiving areas has a positioning device and in particular a centring device which positions and in particular centres a container relative to this receiving area. By positioning it is understood in particular that the containers are positioned with respect to the respective receiving areas in such a way that they have a movement play of less than 5 mm, preferably of less than 4 mm, preferably of less than 3 mm, preferably of less than 2 mm and particularly preferably of less than 1 mm.

This also facilitates image evaluation of the containers. Particularly preferably, the centring device or positioning device moves the container in each case into a central and/or centered position with respect to the associated receiving area.

The present invention is further directed to a device for inspecting bundles, wherein a first transport device is provided which transports receiving containers equipped with containers along a predetermined transport path, wherein the containers each have a marking in their bottom regions which is preferably suitable and intended for unambiguously identifying the containers and/or which is characteristic of at least one property of the containers and/or which is suitable and intended for making at least one physical property of the containers readable and/or determinable.

According to the invention, the apparatus comprises an image recording device which records at least one image of the bottom regions of the containers located in the receiving container or bundle and which preferably outputs at least one information which is characteristic of the markings arranged on the containers and/or the at least one property of the containers (or makes it possible to determine the same).

A apparatus is therefore proposed which reads out corresponding markings on the containers and, in particular, outputs data which are characteristic of these markings and/or of the container on which these markings are arranged.

In a preferred embodiment, the apparatus has a second transport device which transports the bundles or receiving containers to an image recording device and/or transports the bundles or receiving containers away from the image recording device. It is therefore proposed that this transport device transports the containers into an image recording area of the image recording device, in which this image recording device can record at least one image of the containers.

Particularly preferably, the second transport device has a gripping device which is suitable and intended for gripping the containers. In a further advantageous embodiment, the image recording device is arranged stationary (with respect to a movement of the bundles).

Particularly preferably, an illumination device is provided which illuminates the containers and/or the receiving container for the purpose of image recording. In this way, it is easier to determine the marking on the containers by evaluating the image.

Particularly preferably, the apparatus has an (image) evaluation device that evaluates the recorded images, in particular with regard to the attached markings. It is possible that the (image) evaluation device only determines that markings are present. However, it is also conceivable that each individual marking is read out.

It should be noted that this (image) evaluation device can preferably also detect the marking independently of a rotational position of the containers. Usually, the containers are not in a defined rotational position in a receiving container, but randomly. Depending on the marking, the evaluation device can determine whether and, if applicable, how the marking is rotated in order to nevertheless enable an evaluation of the marking.

Particularly preferably, several markings and/or several containers are recorded simultaneously by the image recording device and the corresponding images are particularly preferably evaluated. In particular, it can also be determined whether there are containers without markings in the receiving container.

Particularly preferably, the first transport device is a conveyor belt. Particularly preferably, the second transport device is a robot and especially a multi-axis robot.

Particularly preferably, the apparatus has a container removal device which is suitable and intended for removing individual containers from the bundle or the receiving container. It is possible that these containers are removed in response to an image recorded and/or evaluated by the image recording device.

BRIEF DESCRIPTION OF THE DRAWINGS

Further advantages and embodiments can be seen in the attached drawings:
In the drawings.

DETAILED DESCRIPTION OF THE INVENTION

Figure 1:
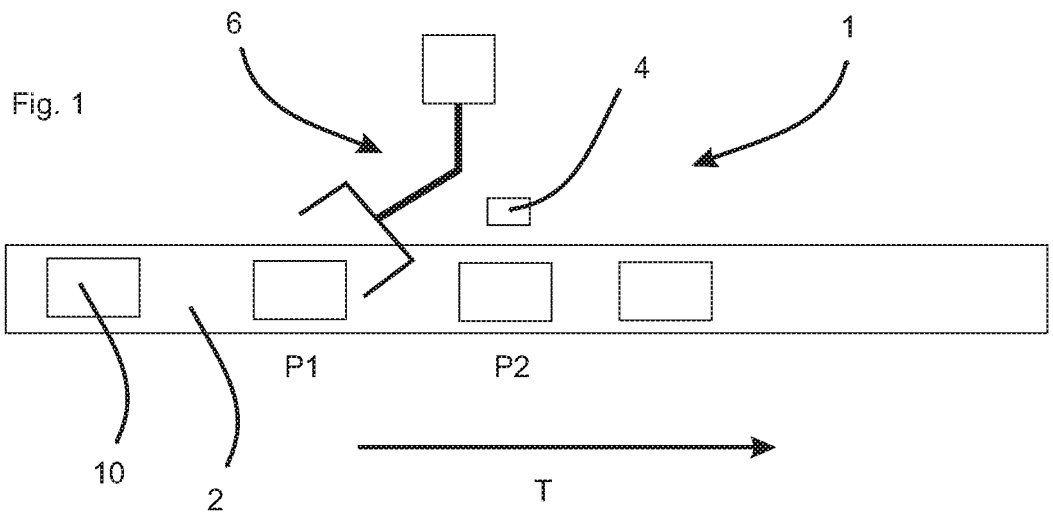
FIG. 1 shows a representation of an apparatus according to the invention.

FIG. 1 shows a schematic representation of an apparatus 1 according to the invention, which has a transport device 2 in the form of a conveyor belt on which receiving containers 10 for containers (not shown) are transported along the transport path T. The reference signs P1 and P2 indicate two possible positions of the receiving containers 10 on the transport device 2. Preferably, the first transport device 2 transports the receiving containers 10 in a straight line.

The reference sign 6 indicates a second transport device which is used to grip the receiving containers 10 and to pivot them over an image recording device 4 so that the latter can record images of the undersides of the containers 20. Preferably, this second transport device 6 enables transport or movement of the receiving containers 10 in at least two directions perpendicular to each other and preferably in three directions perpendicular to each other.

Preferably, a transport path of the containers 20 transported by the second transport device 6 is changeable and in particular freely programmable.

Figure 2:
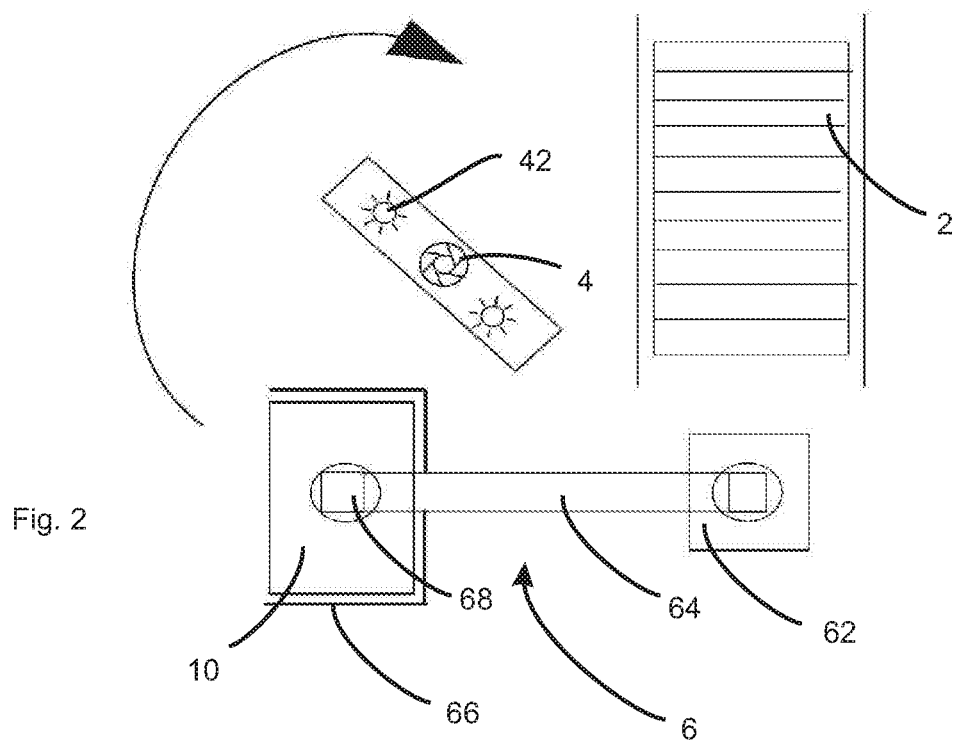
FIG. 2 shows a more detailed illustration of an apparatus according to the invention.

FIG. 2 shows a more detailed representation of this removal of the receiving containers 10. Here, the second transport device 6 has a drive device 62 which can pivot a pivoting arm 64. The actual gripping device 66, which grips the containers 20, is arranged on this pivoting arm 64 via a rotary drive 68.

The receiving containers 10 can be transported over the image recording device 4. As mentioned above, the transport can be stopped when the receiving device 10 is positioned above the image recording device 4.

The reference sign 42 indicates illumination devices which can illuminate the underside of the receiving container 10 and/or the containers 20 from below for the purpose of image recording. This illumination and also the image recording can be optimised for the respective containers 20 used and the marking 12 arranged thereon.

Figure 3:
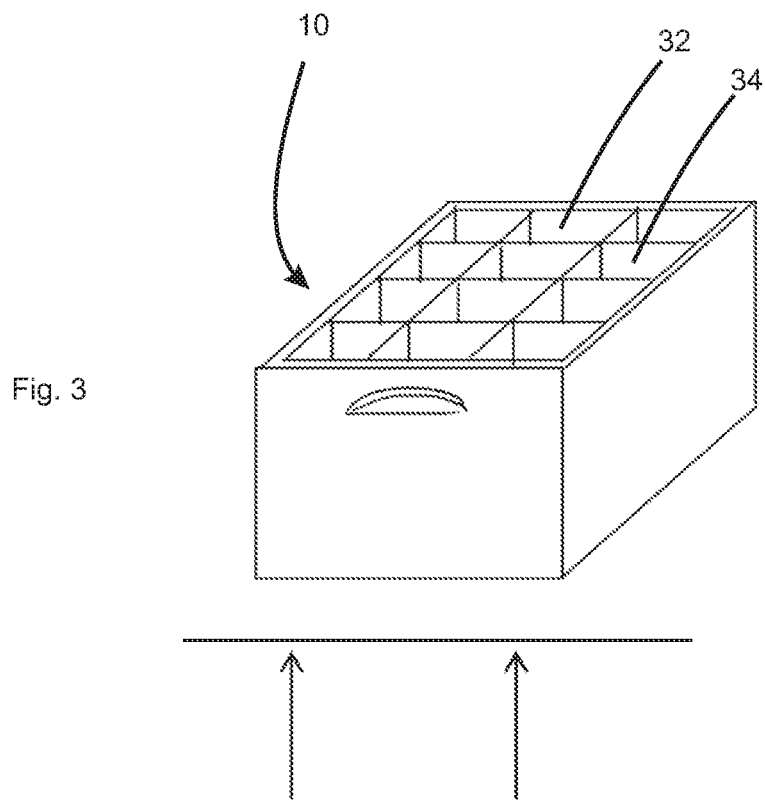
FIG. 3 shows a representation of a receiving container.

FIG. 3 shows an illustration of a receiving container 10, which has a plurality of receiving areas (only two receiving areas 32, 34 shown here) into each of which containers 20 can be placed.

Figure 4:
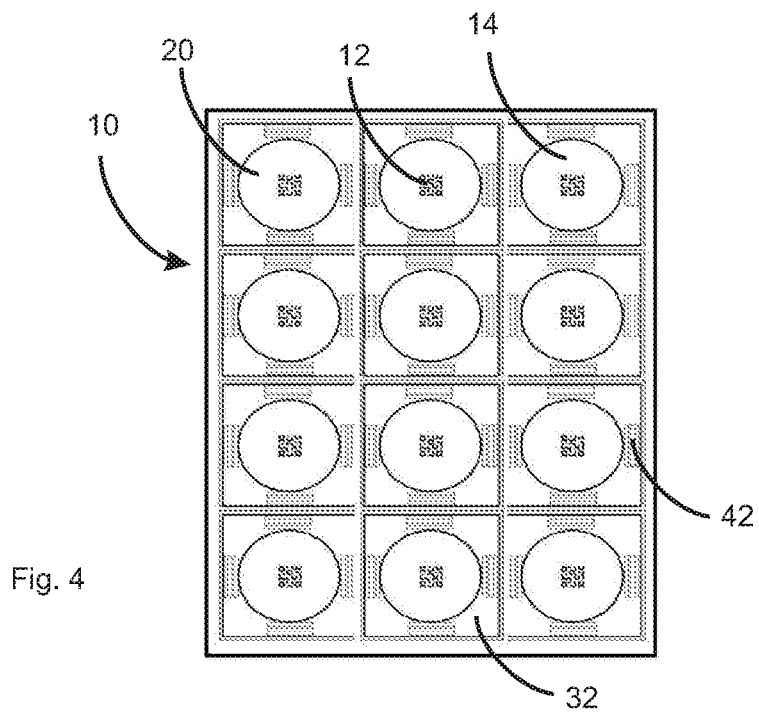
FIG. 4 shows a view of a loaded receiving container from below.

FIG. 4 shows a receiving container 10 filled with containers 20 from below. Here, containers 20, such as bottles, are located in the receiving containers 10 or in the individual receiving areas 32, 34 . . . respectively. These bottles each have a marking 12 which is arranged on the container bottom 14.

The reference sign 42 indicates centring devices and/or positioning devices which centre and/or position the containers 20 relative to the receiving areas 32.

The image recording device 4 can record an image of the receiving containers 10 with the total of twelve containers 20. Furthermore, the image evaluation device allows the evaluation of the individual markings 12 and thus also a statement about characteristic properties of the individual containers 20.

The applicant reserves the right to claim all features disclosed in the application documents as essential to the invention, provided that they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:
1. A method for inspecting bundles, wherein receiving containers equipped with containers are transported by a first transport device and wherein the containers each have a marking in their bottom regions which unambiguously identifies the containers,
wherein
an image recording device records at least one image of the bottom regions of the containers located in the receiving container and at least one information is output which is characteristic of the markings arranged on the containers and/or of at least one property of the containers, and
wherein
the receiving containers are gripped by a gripping device and are brought into an image receiving area of the image receiving device.

2. The method according to claim 1,
wherein
the image recording device is arranged stationary and the receiving containers are transported past the image recording device.

3. The method according to claim 1,
wherein
the receiving containers are transported by a second transport device, which differs from the first transport device, for the purpose of image recording.

4. The method according to claim 3,
wherein
the second transport device removes the receiving containers from the first transport device.

5. The method according to claim 1,
wherein
a movement of the receiving containers is stopped at least temporarily in order to take an image of the bottom regions.

6. The method according to claim 1,
wherein
the containers are positioned in predetermined positioning relative to the receiving containers.

7. The method according to claim 1,
wherein
at least a portion of the containers is removed from the receiving container.

8. The method according to claim 7,
wherein
at least one container or the portion of containers is removed in response to an image captured by the image recording device.

9. A receiving container for receiving containers, wherein the receiving containers having a plurality of receiving areas for receiving the containers separately from one another and in the same orientation, wherein one container is received in each receiving area, and wherein the receiving container having at least one wall delimiting this receiving container, and wherein each of these receiving areas having a bottom in order to support the containers via their bottom regions,
wherein
each of these bottoms has a recess through which a bottom of a container located in this receiving area can be observed, and wherein
the receiving containers are gripped by a gripping device and are brought into an image receiving area of the image receiving device.

10. The receiving container according to claim 9,
wherein
at least one of the receiving areas comprises a positioning device and/or centring device which centres a container relative to said receiving area.

11. An apparatus for inspecting bundles, having a first transport device configured to transport receiving containers fitted with containers along a predetermined transport path, wherein the containers each having a marking in their bottom regions which unambiguously identifies the containers and/or which is characteristic of at least one property of the containers,
wherein
the apparatus has an image recording device configured to record at least one image of the bottom regions of the containers located in the receiving container and to output at least one information which is characteristic of the markings arranged on the containers and/or of the containers and/or of at least one property of the containers, and wherein
the apparatus comprises a second transport device configured to transport the receiving containers to the image receiving device and/or to transport the receiving containers away from the image receiving device.

12. The apparatus according to claim 11,
wherein
the apparatus comprises a container removal device which is configured to remove individual containers from the receiving container.

* * * * *